(12) United States Patent
Chan et al.

(10) Patent No.: US 8,326,073 B2
(45) Date of Patent: Dec. 4, 2012

(54) METHOD FOR BEAUTIFYING HUMAN FACE IN DIGITAL IMAGE

(75) Inventors: Chen-Hung Chan, Taoyuan County (TW); Hong-Long Chou, Taipei (TW)

(73) Assignee: Altek Corporation, Hsinchu (TW)

( * ) Notice: Subject to any disclaimer, the term of this patent is extended or adjusted under 35 U.S.C. 154(b) by 799 days.

(21) Appl. No.: 12/471,013

(22) Filed: May 22, 2009

(65) Prior Publication Data

US 2010/0166331 A1 Jul. 1, 2010

(30) Foreign Application Priority Data

Dec. 31, 2008 (TW) ................. 97151818 A (51) Int. Cl.
*G06K 9/40* (2006.01)
(52) U.S. Cl. .......... 382/260; 235/494; 341/51; 348/242; 382/118; 382/124; 382/164; 382/165; 382/167; 382/199; 382/275; 382/276; 702/85
(58) Field of Classification Search .................. None
See application file for complete search history.

(56) References Cited

U.S. PATENT DOCUMENTS

| | | | | |
|---|---|---|---|---|
| 6,148,092 A | * | 11/2000 | Qian | 382/118 |
| 6,332,033 B1 | * | 12/2001 | Qian | 382/124 |
| 6,816,611 B1 | * | 11/2004 | Hagiwara et al. | 382/165 |
| 2002/0104891 A1 | * | 8/2002 | Otto | 235/494 |
| 2006/0036383 A1 | * | 2/2006 | Clare et al. | 702/85 |
| 2007/0132865 A1 | * | 6/2007 | Adams et al. | 348/242 |
| 2008/0018506 A1 | * | 1/2008 | Raveendran | 341/51 |
| 2008/0166042 A1 | * | 7/2008 | Pan et al. | 382/164 |
| 2008/0166044 A1 | * | 7/2008 | Pan et al. | 382/167 |
| 2008/0212894 A1 | * | 9/2008 | Demirli et al. | 382/276 |
| 2009/0016639 A1 | * | 1/2009 | Ueda | 382/275 |
| 2009/0316962 A1 | * | 12/2009 | Sun et al. | 382/118 |
| 2010/0086217 A1 | * | 4/2010 | Matsuhira | 382/199 |

* cited by examiner

*Primary Examiner* — Tsung-Yin Tsai
(74) *Attorney, Agent, or Firm* — Morris, Manning & Martin, LLP; Tim Tingkang Xia, Esq.

(57) ABSTRACT

A method for beautifying a human face in a digital image is adapted to beautify a face area of an input image. The method includes setting a selection window to select a partial image area in the input image; setting a target pixel in the selection window, and setting other pixels as comparison pixels; performing a detail checking process according to a variance between the target pixel; performing a luminance checking process on the target pixel to determine; performing a nonlinear filtering process to filter the target pixel by using a nonlinear filter to generate a filtered value, and providing a mixing ratio to mix the target pixel with the filtered value at the mixing ratio to generate a completed pixel; replacing the original target pixel with the completed pixel; and repeating the above steps until all pixels are completed.

20 Claims, 6 Drawing Sheets

METHOD FOR BEAUTIFYING HUMAN FACE IN DIGITAL IMAGE

CROSS-REFERENCE TO RELATED APPLICATIONS

This non-provisional application claims priority under 35 U.S.C. §119(a) on Patent Application No(s). 097151818 filed in Taiwan, R.O.C. on Dec. 31, 2008 the entire contents of which are hereby incorporated by reference.

BACKGROUND OF THE INVENTION

1. Field of Invention

The present invention relates to a digital image processing method, and more particularly to a method for beautifying a human face in a digital image.

2. Related Art

With the development of digital cameras, photography is no longer expensive. A user can capture a desired image at will to record a memorable moment or scene. Especially, many photographers mainly focus on shooting portraits. However, if a person to be shot has spots, dust, fine wrinkles, or the like on the face during shooting, the aesthetic feeling of viewers about the shot digital image may be affected.

This problem may be solved by using digital image editing software to edit details of the digital image. However, as ordinary users are not all familiar with the image editing software, it is difficult for beginners to employ this method. Another method is to soften the image. Although the colors of the above color block portion can be diluted through this method, portions in the digital image that do not need to be adjusted are also softened as the softening process is used for processing the entire digital image. As a result, the aesthetic feeling of the digital image is lowered.

SUMMARY OF THE INVENTION

Accordingly, the present invention is a method for beautifying a human face in a digital image, so as to remove noises (freckles, dark spots, pores, or fine wrinkles) on the skin of a human face in an input image.

To achieve the above objective, the method for beautifying a human face in a digital image provided in the present invention comprises the following steps: a. setting a selection window to select a partial image area in an input image; b. setting a target pixel in the selection window, and setting other pixels as comparison pixels; c. performing a detail checking process according to a variance between the target pixel and the comparison pixels to determine whether the target pixel has detail information or not; d. performing a luminance checking process on the target pixel in the selection window to determine whether the target pixel is within a luminance range or not; e. if the target pixel is within the luminance range, performing a nonlinear filtering process to filter the target pixel by using a nonlinear filter to generate a filtered value, and providing a mixing ratio to mix the target pixel with the filtered value at the mixing ratio to generate a completed pixel; and f. repeating Step a to step e until all pixels in the input image are completed, and outputting a target image.

Through the method for processing a skin color in a digital image provided in the present invention, non-skin-color noises can be removed. Moreover, as non-skin-color pixels are compensated by using surrounding pixels, not only the image can be beautified, but the damage to the original image can also be reduced.

BRIEF DESCRIPTION OF THE DRAWINGS

The present invention will become more fully understood from the detailed description given herein below for illustration only, and thus are not limitative of the present invention, and wherein.

DETAILED DESCRIPTION OF THE INVENTION

The method of the present invention is applicable to electronic devices with an image processing function, such as personal computers, digital cameras, and digital photo albums. However, it should be noted that, the method of the present invention is not limited to the above examples. To make the technical solution of the present invention comprehensible, the following terms are defined herein.

An input image P is an image in a size of x*y pixel array. A selection window is an m*n pixel array, where m and n are positive integers. In an embodiment of the present invention, the selection window is, for example, but not limited to, a 5*5 pixel array. The pixel arrangement in the selection window is as shown in Table 1. Pn is the n-th position in the selection window. In this implementation description, P12 is taken

TABLE 1

| Selection Window | | | | |
| --- | --- | --- | --- | --- |
| P0 | P1 | P2 | P3 | P4 |
| P5 | P6 | P7 | P8 | P9 |
| P10 | P11 | P12 | P13 | P14 |
| P15 | P16 | P17 | P18 | P19 |
| P20 | P21 | P22 | P23 | P24 |

Figure 1:
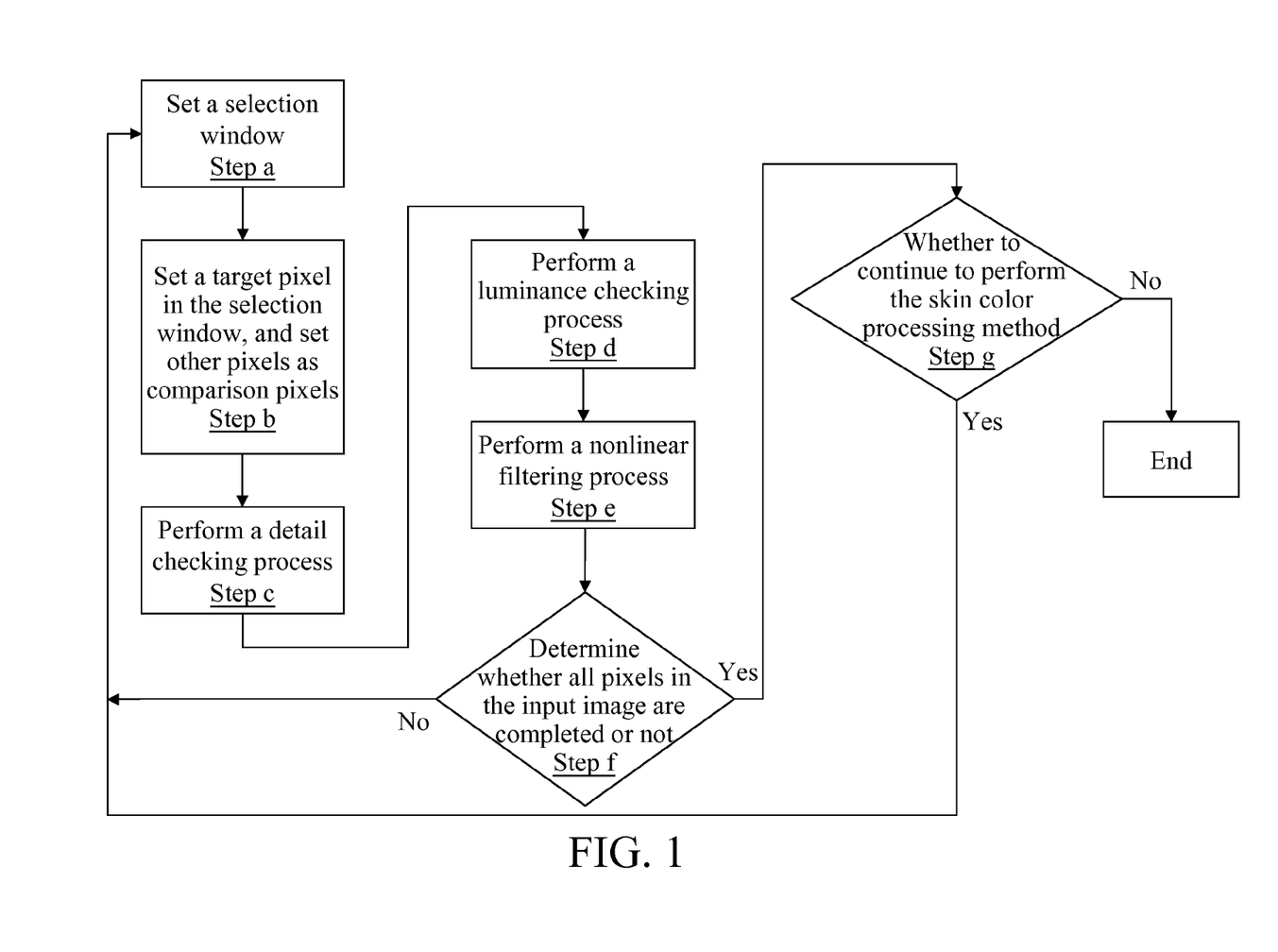
FIG. 1 is a schematic flow chart of the present invention.

FIG. 1 is a schematic flow chart of the present invention. Referring to FIG. 1, the present invention comprises the following steps.

In Step a, a selection window is set to select a partial image area in an input image.

In Step b, a target pixel is set in the selection window, and other pixels are set as comparison pixels.

In Step c, a detail checking process is performed according to a variance between the target pixel and the comparison pixels to determine whether the target pixel has detail information or not.

In Step d, if the target pixel has the detail information, a luminance checking process is performed on the target pixel in the selection window to determine whether the target pixel is within a luminance range or not.

In Step e, if the target pixel is within the luminance range, a nonlinear filtering process is performed to filter the target pixel by using a nonlinear filter to generate at least one filtered value, and a mixing ratio is provided to mix the target pixel with the filtered value at the mixing ratio to generate a completed pixel, and the target pixel is then replaced with the completed pixel.

In Step f, it is determined whether all pixels in the input image are completed or not; if no, Step a to step e are repeated until all pixels in the input image are completed, and a target image is then output.

In Step g, it is determined whether to continue to perform the skin color processing method (i.e., perform Step a to Step f) or not.

Figure 2:
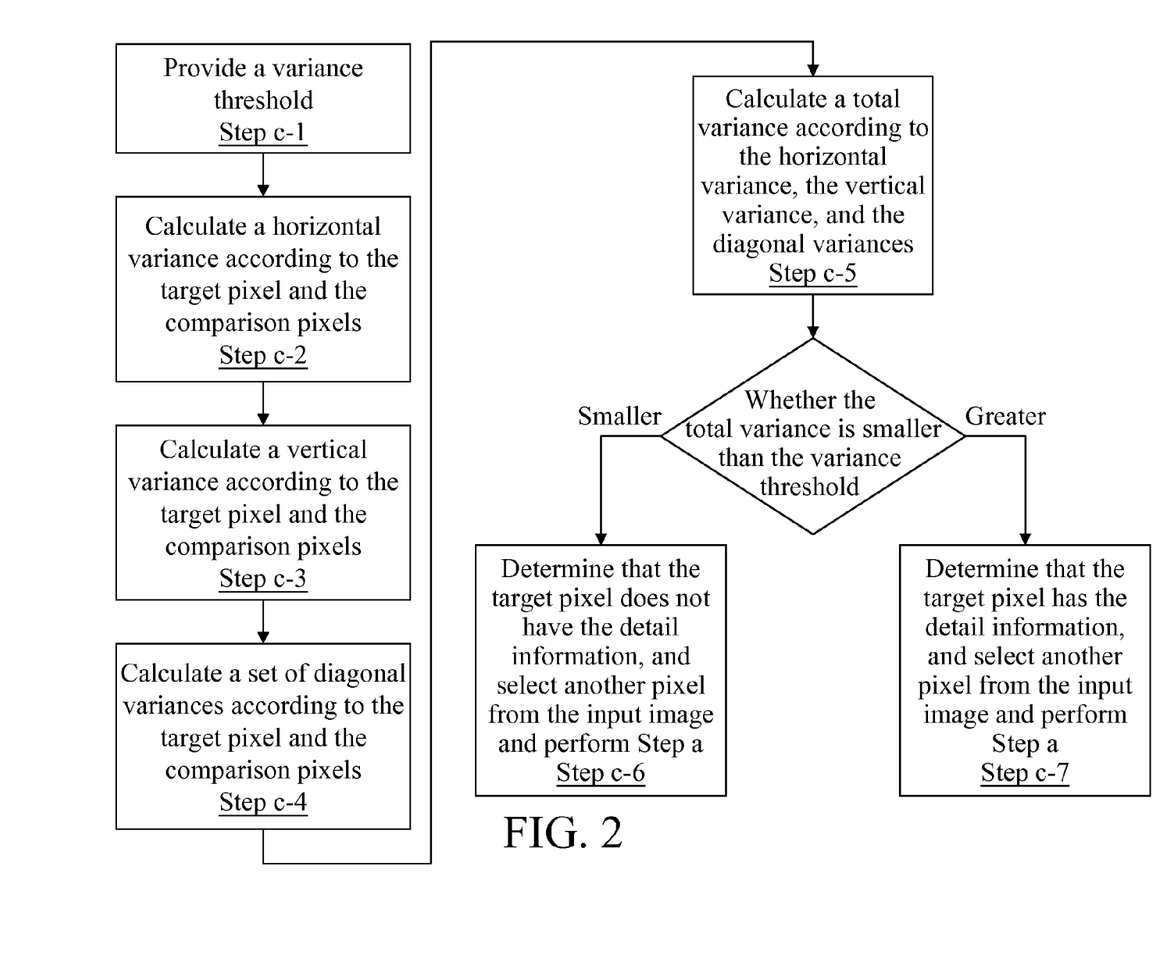
FIG. 2 is a schematic flow chart of Step c.

In the present invention, Step c, Step d, and Step e further comprise their own operating modes. FIG. 2 is a schematic flow chart of Step c. The luminance checking process is used to detect whether the target pixel has image details. The image details are non-skin pixels such as hair, eyelashes, glasses, and earrings of a person captured in the image. Step c further comprises the following steps.

In Step c-1, a variance threshold is provided.

In Step c-2, a horizontal variance SAD_H is calculated according to the target pixel and the comparison pixels.

In Step c-3, a vertical variance SAD_V is calculated according to the target pixel and the comparison pixels.

In Step c-4, a set of diagonal variances SAD_D1, SAD_D2 are calculated according to the target pixel and the comparison pixels.

In Step c-5, a total variance SAD is calculated according to the horizontal variance SAD_H, the vertical variance SAD_V, and the diagonal variances SAD_D1, SAD_D2.

In Step c-6, if the total variance SAD is smaller than the variance threshold, it is determined that the target pixel does not have the detail information, and another pixel is selected from the input image and Step a is performed.

In Step c-7, if the total variance SAD is greater than the variance threshold, it is determined that the target pixel has the detail information, and another pixel is selected from the input image and Step a is performed.

The horizontal variance SAD_H of Step c-2 is given by Equation 1:

$$SAD\_H=|P2-P3|+|P7-P8|+|P12-P13|+|P17-P18|+|P22-P23| \quad \text{(Equation 1)}$$

The vertical variance SAD_V of Step c-3 is given by Equation 2:

$$SAD\_V=|P5-P10|+|P6-P11|+|P7-P12|+|P8-P13|+|P9-P14| \quad \text{(Equation 2)}$$

The diagonal variances SAD_D1, SAD_D2 of Step c-4 are given by Equation 3:

$$SAD\_D1=|P1-P5|+|P7-P11|+|P13-P17|+|P19-P23|$$

$$SAD\_D2=|P3-P9|+|P7-P13|+|P11-P17|+|P15-P21| \quad \text{(Equation 3)}$$

The total variance SAD of Step c-5 is given by Equation 4:

$$SAD=SAD\_H+SAD\_V+SAD\_D1+SAD\_D2 \quad \text{(Equation 4)}$$

When the total variance SAD is smaller than the variance threshold, the target pixel has no detail.

Then, the luminance checking process is used to pick out the target pixel within the luminance range, and mainly aims to check whether the target pixel is a freckle, a dark spot, a pore, or a fine wrinkle.

Figure 3:
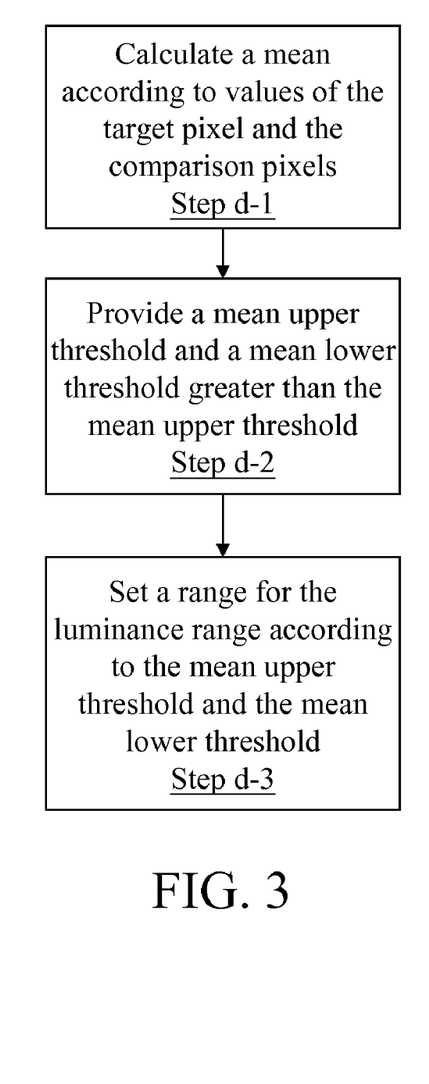
FIG. 3 is a schematic flow chart of the luminance checking process.

The method further comprises the following steps before performing the luminance checking process of Step d. FIG. 3 is a schematic flow chart of the luminance checking process.

In Step d-1, a mean is calculated according to values of the target pixel and the comparison pixels.

In Step d-2, a mean upper threshold Mean_THU and a mean lower threshold Mean_THL greater than the mean upper threshold Mean_THU are provided.

In Step d-3, a range is set for the luminance range according to the mean upper threshold Mean_THU and the mean lower threshold Mean_THL.

In Step d-1, the mean is calculated according to Equation 5 below:

$$\text{Mean} = \frac{1}{25} \times \sum_{i=0}^{24} P_i, \quad \text{(Equation 5)}$$

where, Pi is the i-th position in the selection window.

If the luminance of the target pixel falls within the luminance range (that is, the mean upper threshold Mean_THU< the luminance of the target pixel< the mean lower threshold Mean_THL), the target pixel is a freckle, a dark spot, a pore, or a fine wrinkle.

Figure 4:
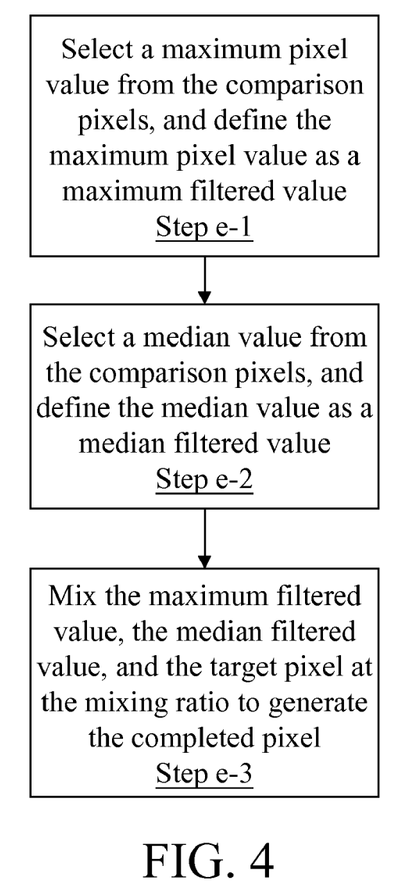
FIG. 4 is a schematic flow chart of the nonlinear filtering process.

FIG. 4 is a schematic flow chart of the nonlinear filtering process. Referring to FIG. 4, the process for generating the filtered value further comprises the following steps.

In Step e-1, a maximum pixel value is selected from the comparison pixels, and the maximum pixel value is defined as a maximum filtered value P_Max.

In Step e-2, a median value is selected from the comparison pixels, and the median value is defined as a median filtered value P_Mid.

In Step e-3, the maximum filtered value P_Max, the median filtered value P_Mid, and the target pixel are mixed at the mixing ratio to generate the completed pixel.

The maximum filtered value P_Max and the median filtered value P_Mid are calculated according to Equation 6 and Equation 7:

$$P\_Max=\max(P_0,P_1,P_2,\ldots,P_{24}) \quad \text{(Equation 6)},$$

$$P\_Mid=\text{median}(P_0,P_1,P_2,\ldots,P_{24}) \quad \text{(Equation 7)}.$$

Then, the maximum filtered value P_Max, the median filtered value P_Mid, and the target pixel are mixed at the mixing ratio. Herein, the mixing ratio is respectively defined as a constant a:a constant b:a constant c, and a+b+c=1. Referring to Equation 8, the result of the nonlinear filtering process is output, and then used to replace the original target pixel:

$$P_{12}=a \times P\_Max+b \times P\_Mid+c \times P_{12} \quad \text{(Equation 8)}.$$

Figure 5:
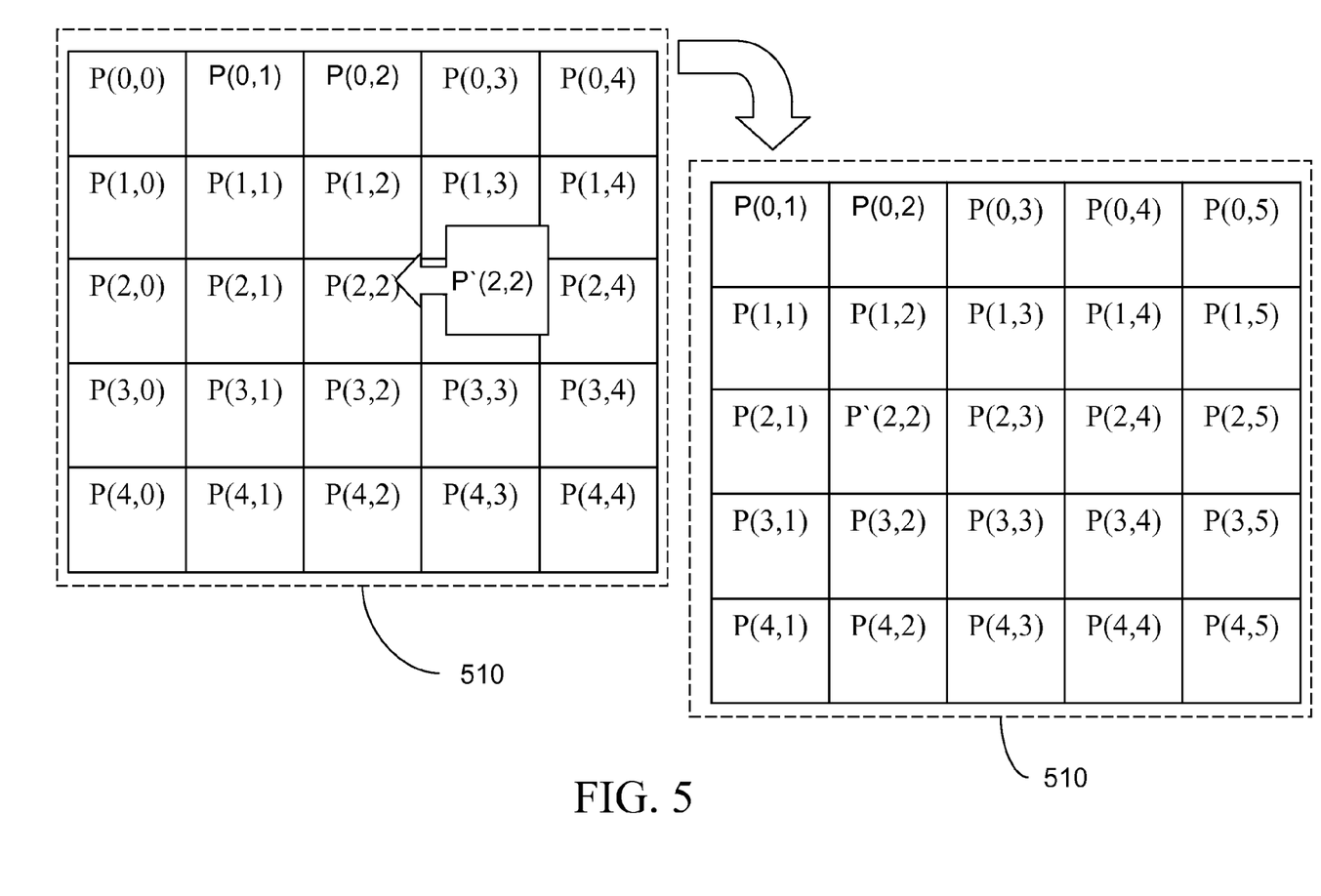
FIG. 5 is a schematic view of the target pixel in different rounds.

In such a manner, when the next round of skin color processing is performed, the color fading of the next target pixel can be accelerated. This is because the luminance value of the target image in the previous round has been changed, and the target image in the previous round will be substituted into the calculation of a target pixel in a new round. FIG. 5 is a schematic view of the target pixel in different rounds. FIG. 5 shows a first round of skin color processing on the left (dashed-line square represent a selection window 510), and a first round of skin color processing on the right. In first round of skin color processing, the result of the nonlinear filtering process (that is, P'(2,2) of the selection window 510 in FIG. 5) is generated, and used to replace the luminance value of the original target pixel. Therefore, in the second round, the luminance value of the pixel at the position (2,2) is changed into P'(2,2).

In Step g, the number of rounds of skin color processing can be determined by a user according to sizes of the input image and the selection window 510. For example, if the selection window is small or the input image is small, a small number of rounds of skin color processing may be set, and vice versa. The non-skin-color noises in the input image can be reduced after each round of skin color processing.

Figure 6:
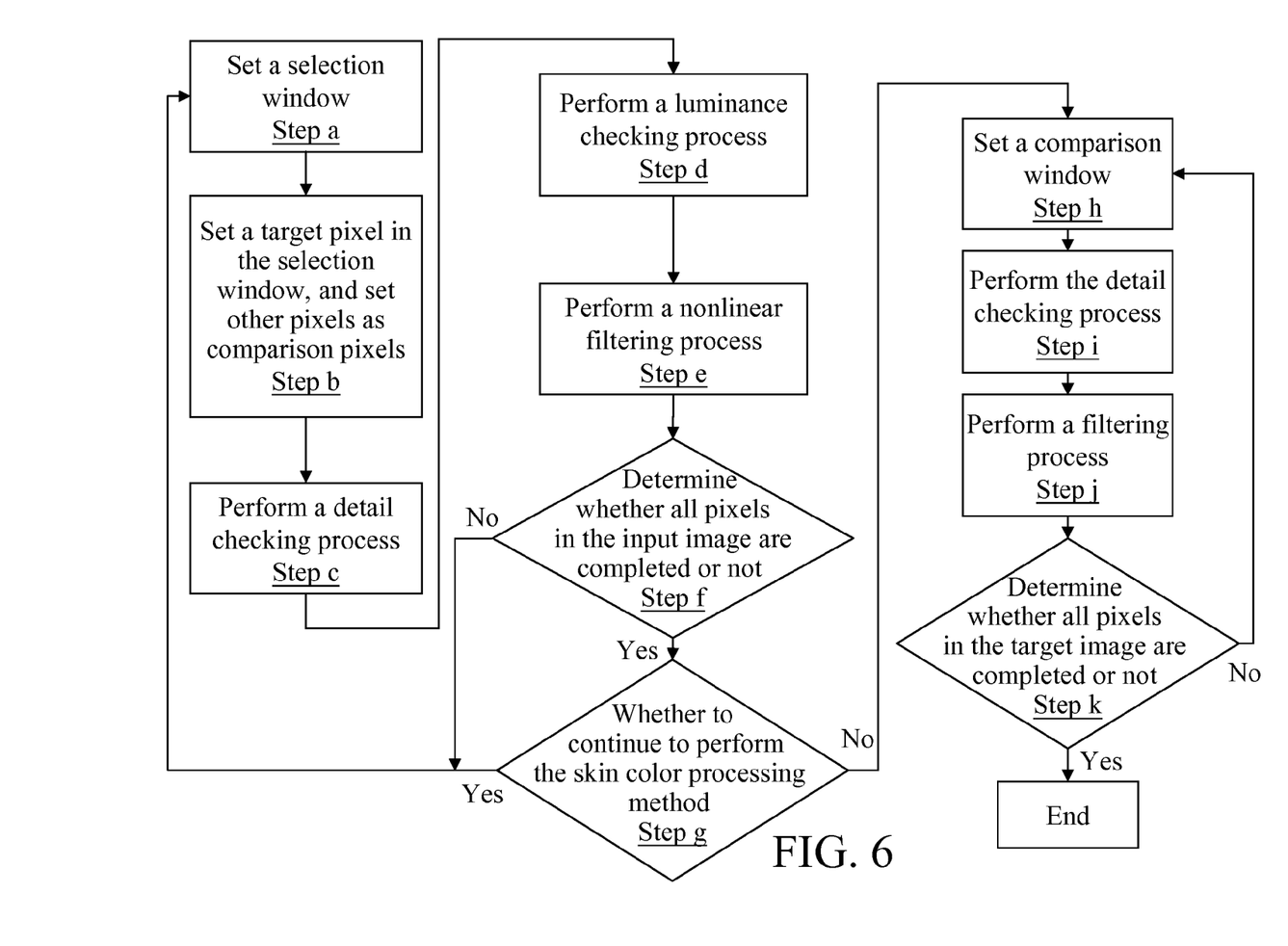
FIG. 6 is a schematic flow chart of another embodiment.

In addition to the above embodiment, the present invention further provides another embodiment. FIG. 6 is a schematic flow chart of another embodiment. Referring to FIG. 6, this embodiment comprises the following steps.

In Step a, a selection window is set to select a partial image area in an input image.

In Step b, a target pixel is set in the selection window, and other pixels are set as comparison pixels.

In Step c, a detail checking process is performed according to a variance between the target pixel and the comparison pixels to determine whether the target pixel has detail information or not.

In Step d, if the target pixel has the detail information, a luminance checking process is performed on the target pixel in the selection window to determine whether the target pixel is within a luminance range or not.

In Step e, if the target pixel is within the luminance range, a nonlinear filtering process is performed to filter the target pixel by using a nonlinear filter to generate at least one filtered value, and a mixing ratio is provided to mix the target pixel with the filtered value at the mixing ratio to generate a completed pixel, and then the target pixel is replaced with the completed pixel.

In Step f, it is determined whether all pixels in the input image are completed or not; if no, Step a to step e are repeated until all pixels in the input image are completed, and a target image is output.

In Step g, it is determined whether to continue to perform the skin color processing method; if no, Step a to Step f are performed to generate another target image.

In Step h, a comparison window is set to select a partial image area in the target image, a target pixel is set in the comparison window, and other pixels are set as comparison pixels.

In Step i, the detail checking process is performed to detect the target pixel having the detail information according to a variance between the target pixel and the comparison pixels.

In Step j, a filtering process is performed on the target pixel having the detail information to output a finished pixel.

In Step k, it is determined whether all pixels in the target image are completed or not; if no, Step h to Step j are repeated until all pixels in the target image are completed, and a completed image is output.

Step a to Step g in this embodiment are the same as those in the previous embodiment, and detailed implementations of Step h and Step i are respectively the same as Step c and Step d, so the details will not be described herein again. The difference between this embodiment and the previous embodiment lies in that, the filtering process of Step j is difference. In Step j, the target pixel in the comparison window is processed according to Equation 9:

$$P(x, y) = \frac{\sum_{(i,j) \in WOI \ \& \ |P(i,j)-P(x,y)|<TH} P(i, j)}{N(x, y)},$$ (Equation 9)

where, WOI is the comparison window, (x,y) is a coordinate position of a pixel in the comparison window, TH is a filtering threshold, and N is the total number of pixels in the comparison window that satisfy $$|P(i,j)-P(x,y)|<TH$$

Step h-Step i are performed to further harmonize the skin color in the digital image and remove pixels with pores and fine wrinkles. In such a manner, the face in the digital image looks more beautiful and smoother.

Through the method for processing a skin color in a digital image provided in the present invention, non-skin-color noises can be removed. Moreover, as non-skin-color pixels are compensated by using surrounding pixels, not only the image can be beautified, but the damage to the original image can also be reduced.

What is claimed is:

1. A method for beautifying a human face in a digital image, adapted to remove noises on the skin of a human face in an input image, the method comprising:
   a. selecting a partial image area in the input image as a selection window;
   b. setting a target pixel in the selection window, and setting other pixels as comparison pixels;
   c. performing a detail checking process according to a variance between the target pixel and the comparison pixels to determine whether the target pixel has detail information or not;
   d. if the target pixel has the detail information, performing a luminance checking process on the target pixel to determine whether the target pixel is within a luminance range or not;
   e. if the target pixel is within the luminance range, performing a nonlinear filtering process to filter the target pixel by using a nonlinear filter to generate a filtered value, and providing a mixing ratio to mix the target pixel with the filtered value at the mixing ratio to generate a completed pixel, and replacing the target pixel with the completed pixel; and
   f. repeating Step a to Step e until all pixels in the input image are completed, and outputting a target image.

2. The method for beautifying a human face in a digital image according to claim 1, wherein the selection window is an m*n pixel array, and m and n are positive integers.

3. The method for beautifying a human face in a digital image according to claim 1, wherein Step c comprises:
   providing a variance threshold;
   calculating a horizontal variance SAD_H according to the target pixel and the comparison pixels;
   calculating a vertical variance SAD_V according to the target pixel and the comparison pixels;
   calculating a set of diagonal variances SAD_D1, SAD_D2 according to the target pixel and the comparison pixels;
   calculating a total variance SAD according to the horizontal variance SAD_H, the vertical variance SAD_V, and the diagonal variances SAD_D1, SAD_D2;
   if the total variance SAD is smaller than the variance threshold, determining that the target pixel does not have the detail information, and selecting another pixel from the input image and performing Step a; and
   if the total variance SAD is greater than the variance threshold, determining that the target pixel has the detail information, and selecting another pixel from the input image and performing Step a.

4. The method for beautifying a human face in a digital image according to claim 1, wherein before Step d, the method further comprises:
   calculating a mean according to values of the target pixel and the comparison pixels;
   providing a mean upper threshold Mean_THU and a mean lower threshold Mean_THL greater than the mean upper threshold Mean_THU; and
   setting a range for the luminance range according to the mean upper threshold Mean_THU and the mean lower threshold Mean_THL.

5. The method for beautifying a human face in a digital image according to claim 1, wherein the process for generating the filtered value in Step e comprises:
- selecting a maximum pixel value from the comparison pixels, and defining the maximum pixel value as a maximum filtered value P_Max;
- selecting a median value from the comparison pixels, and defining the median value as a median filtered value P_Mid; and
- mixing the maximum filtered value P_Max, the median filtered value P_Mid, and the target pixel at the mixing ratio to generate the completed pixel.

6. The method for beautifying a human face in a digital image according to claim 1, wherein after Step f, the method further comprises:
- g. determining whether to continue to perform Step a to Step f.

7. The method for beautifying a human face in a digital image according to claim 6, wherein after Step g, the method further comprises:
- h. setting a comparison window to select the partial image area in the target image, setting the target pixel in the comparison window, and setting other pixels as the comparison pixels;
- i. performing the detail checking process to detect the target pixel having the detail information according to the variance between the target pixel and the comparison pixels;
- j. performing a filtering process on the target pixel having the detail information to output a finished pixel; and
- k. repeating Step h-Step j until all pixels in the target image are completed, and outputting a completed image.

8. The method for beautifying a human face in a digital image according to claim 7, wherein Step i comprises:
- if it is detected that the target pixel does not have the detail information, selecting another pixel from the target image, and repeating Step h.

9. A method for beautifying a human face in a digital image, adapted to remove noises on the skin of a human face in an input image, the method comprising:
- a. selecting a partial image area in the input image as a selection window;
- b. setting a target pixel in the selection window, and setting other pixels as comparison pixels;
- c. performing a detail checking process according to a variance between the target pixel and the comparison pixels to determine whether the target pixel has detail information or not, comprising:
  - providing a variance threshold;
  - calculating a horizontal variance SAD_H according to the target pixel and the comparison pixels;
  - calculating a vertical variance SAD_V according to the target pixel and the comparison pixels;
  - calculating a set of diagonal variances SAD_D1, SAD_D2 according to the target pixel and the comparison pixels;
  - calculating a total variance SAD according to the horizontal variance SAD_H, the vertical variance SAD_V, and the diagonal variances SAD_D1, SAD_D2;
  - if the total variance SAD is smaller than the variance threshold, determining that the target pixel does not have the detail information, and selecting another pixel from the input image and performing Step a; and
  - if the total variance SAD is greater than the variance threshold, determining that the target pixel has the detail information, and selecting another pixel from the input image and performing Step a;
- d. if the target pixel has the detail information, performing a luminance checking process on the target pixel to determine whether the target pixel is within a luminance range or not;
- e. if the target pixel is within the luminance range, performing a nonlinear filtering process to filter the target pixel by using a nonlinear filter to generate a filtered value, and providing a mixing ratio to mix the target pixel with the filtered value at the mixing ratio to generate a completed pixel, and replacing the target pixel with the completed pixel; and
- f. repeating Step a to Step e until all pixels in the input image are completed, and outputting a target image.

10. The method for beautifying a human face in a digital image according to claim 9, wherein before Step d, the method further comprises:
- calculating a mean according to values of the target pixel and the comparison pixels;
- providing a mean upper threshold Mean_THU and a mean lower threshold Mean_THL greater than the mean upper threshold Mean_THU; and
- setting a range for the luminance range according to the mean upper threshold Mean_THU and the mean lower threshold Mean_THL.

11. The method for beautifying a human face in a digital image according to claim 9, wherein the process for generating the filtered value in Step e comprises:
- selecting a maximum pixel value from the comparison pixels, and defining the maximum pixel value as a maximum filtered value P_Max;
- selecting a median value from the comparison pixels, and defining the median value as a median filtered value P_Mid; and
- mixing the maximum filtered value P_Max, the median filtered value P_Mid, and the target pixel at the mixing ratio to generate the completed pixel.

12. The method for beautifying a human face in a digital image according to claim 9, wherein after Step f, the method further comprises:
- g. determining whether to continue to perform Step a to Step f.

13. The method for beautifying a human face in a digital image according to claim 12, wherein after Step g, the method further comprises:
- h. setting a comparison window to select the partial image area in the target image, setting the target pixel in the comparison window, and setting other pixels as the comparison pixels;
- i. performing the detail checking process to detect the target pixel having the detail information according to the variance between the target pixel and the comparison pixels;
- j. performing a filtering process on the target pixel having the detail information to output a finished pixel; and
- k. repeating Step h-Step j until all pixels in the target image are completed, and outputting a completed image.

14. The method for beautifying a human face in a digital image according to claim 13, wherein Step i comprises:
- if it is detected that the target pixel does not have the detail information, selecting another pixel from the target image, and repeating Step h.

15. A method for beautifying a human face in a digital image, adapted to remove noises on the skin of a human face in an input image, the method comprising:
- a. selecting a partial image area in the input image as a selection window;

b. setting a target pixel in the selection window, and setting other pixels as comparison pixels;

c. performing a detail checking process according to a variance between the target pixel and the comparison pixels to determine whether the target pixel has detail information or not;

d. if the target pixel has the detail information, performing a luminance checking process on the target pixel to determine whether the target pixel is within a luminance range or not;

e. if the target pixel is within the luminance range, performing a nonlinear filtering process to filter the target pixel by using a nonlinear filter to generate a filtered value, and providing a mixing ratio to mix the target pixel with the filtered value at the mixing ratio to generate a completed pixel, and replacing the target pixel with the completed pixel, wherein the process for generating the filtered value further comprises:

selecting a maximum pixel value from the comparison pixels, and defining the maximum pixel value as a maximum filtered value P_Max;

selecting a median value from the comparison pixels, and defining the median value as a median filtered value P_Mid; and mixing the maximum filtered value P_Max, the median filtered value P_Mid, and the target pixel at the mixing ratio to generate the completed pixel; and f. repeating Step a to Step e until all pixels in the input image are completed, and outputting a target image.

16. The method for beautifying a human face in a digital image according to claim 15, wherein Step c comprises:

providing a variance threshold;

calculating a horizontal variance SAD_H according to the target pixel and the comparison pixels;

calculating a vertical variance SAD_V according to the target pixel and the comparison pixels;

calculating a set of diagonal variances SAD_D1, SAD_D2 according to the target pixel and the comparison pixels;

calculating a total variance SAD according to the horizontal variance SAD_H, the vertical variance SAD_V, and the diagonal variances SAD_D1, SAD_D2;

if the total variance SAD is smaller than the variance threshold, determining that the target pixel does not have the detail information, and selecting another pixel from the input image and performing Step a; and if the total variance SAD is greater than the variance threshold, determining that the target pixel has the detail information, and selecting another pixel from the input image and performing Step a.

17. The method for beautifying a human face in a digital image according to claim 15, wherein before Step d, the method further comprises:

calculating a mean according to values of the target pixel and the comparison pixels;

providing a mean upper threshold Mean_THU and a mean lower threshold Mean_THL greater than the mean upper threshold Mean_THU; and setting a range for the luminance range according to the mean upper threshold Mean_THU and the mean lower threshold Mean_THL.

18. The method for beautifying a human face in a digital image according to claim 15, wherein after Step f, the method further comprises:

g. determining whether to continue to perform Step a to Step f.

19. The method for beautifying a human face in a digital image according to claim 18, wherein after Step g, the method further comprises:

h. setting a comparison window to select the partial image area in the target image, setting the target pixel in the comparison window, and setting other pixels as the comparison pixels;

i. performing the detail checking process to detect the target pixel having the detail information according to the variance between the target pixel and the comparison pixels;

j. performing a filtering process on the target pixel having the detail information to output a finished pixel; and k. repeating Step h-Step j until all pixels in the target image are completed, and outputting a completed image.

20. The method for beautifying a human face in a digital image according to claim 19, wherein Step i comprises:

if it is detected that the target pixel does not have the detail information, selecting another pixel from the target image, and repeating Step h.

* * * * *